(12) United States Patent
Chen et al.

(10) Patent No.: US 7,945,266 B2
(45) Date of Patent: May 17, 2011

(54) METHOD AND APPARATUS FOR CALL RECOVERY IN A WIRELESS COMMUNICATION SYSTEM

(75) Inventors: Tao Chen, San Diego, CA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 09/738,016

(22) Filed: Dec. 15, 2000

(65) Prior Publication Data
US 2002/0077104 A1    Jun. 20, 2002

Related U.S. Application Data

(60) Provisional application No. 60/251,537, filed on Dec. 5, 2000.

(51) Int. Cl.
*H04W 36/00* (2009.01)
*H04W 4/00* (2009.01)

(52) U.S. Cl. .................... 455/437; 455/421

(58) Field of Classification Search .......... 455/436, 455/437, 438, 456, 69, 450, 442, 421, 456.1–456.6, 455/522, 550, 69.1, 434; 370/336, 335, 342
See application file for complete search history.

(56) References Cited

U.S. PATENT DOCUMENTS

| | | |
|---|---|---|
| 4,901,307 A | 2/1990 | Gilhousen et al. |
| 5,101,501 A | 3/1992 | Gilhousen |
| 5,103,459 A | 4/1992 | Gilhousen et al. |
| 5,267,261 A | 11/1993 | Blakeney, II et al. ............. 375/1 |
| 5,574,996 A | 11/1996 | Raith |
| 5,809,430 A | 9/1998 | D'Amico |
| 5,845,192 A | 12/1998 | Saunders |
| 5,907,542 A | 5/1999 | Kuehnel et al. |
| 5,913,167 A | 6/1999 | Bonta et al. |
| 5,940,743 A | 8/1999 | Sunay et al. |
| 5,999,816 A | 12/1999 | Tiedemann |

(Continued)

FOREIGN PATENT DOCUMENTS

EP          0624994          11/1994

(Continued)

OTHER PUBLICATIONS

International Search Report—PCT/US01/044566, International Search Authority—European Patent Office—Nov. 11, 2002.

(Continued)

*Primary Examiner* — George Eng
*Assistant Examiner* — Khawar Iqbal
(74) *Attorney, Agent, or Firm* — Rupit M. Patel

(57) ABSTRACT

A method and apparatus for call recovery in a wireless communication system (10). When the communication link between a mobile station (38) and a base station (32) is in trouble, the mobile station and the infrastructure prearrange potential rescue base stations (34). The source cell base station contacts all recovery-capable neighbors as potential rescuers. Each rescue base station is instructed to use a default channel for rescue transmissions. The rescue transmission is considered a call recovery operation. The mobile station establishes a soft hand-off with rescue base station, wherein the FL uses the default channel and an alternate channel. Once hand-off is complete the rescue base station discontinues use of the default channel. In one embodiment, the source cell base station provides the mobile station with the list of recovery-capable neighbors as overhead during transmissions and prior to development of the communication link problem.

26 Claims, 11 Drawing Sheets

U.S. PATENT DOCUMENTS

| | | | |
|---|---|---|---|
| 6,112,080 A | 8/2000 | Anderson et al. | |
| 6,144,861 A | 11/2000 | Sundelin et al. | |
| 6,160,999 A | 12/2000 | Chheda et al. | |
| 6,233,455 B1 | 5/2001 | Ramakrishna et al. | |
| 6,301,234 B1* | 10/2001 | Lee | 370/331 |
| 6,337,983 B1* | 1/2002 | Bonta et al. | 455/437 |
| 6,445,918 B1 | 9/2002 | Hellander | |
| 6,445,921 B1 | 9/2002 | Bell | |
| 6,456,613 B1* | 9/2002 | Kato | 370/347 |
| 6,487,191 B1 | 11/2002 | Kang et al. | |
| 6,563,807 B1* | 5/2003 | Kim et al. | 370/331 |
| 6,633,554 B1* | 10/2003 | Dalal | 370/331 |
| 6,633,760 B1* | 10/2003 | Ham et al. | 455/422.1 |
| 6,667,962 B1 | 12/2003 | Lee et al. | |
| 6,721,564 B1* | 4/2004 | Kobayashi | 455/436 |
| 6,741,858 B1 | 5/2004 | Friman et al. | |
| 6,766,173 B1 | 7/2004 | Chun et al. | |
| 6,785,249 B2 | 8/2004 | Soliman | |
| 6,842,625 B2 | 1/2005 | Francl et al. | |
| 7,054,631 B2 | 5/2006 | Tee | |
| 7,260,401 B2 | 8/2007 | Chen et al. | |
| 7,409,138 B1 | 8/2008 | Frazier et al. | |
| 7,409,448 B2 | 8/2008 | Frazier et al. | |
| 2001/0021653 A1* | 9/2001 | Han | 455/450 |
| 2001/0055969 A1* | 12/2001 | Bonta et al. | 455/436 |
| 2002/0045443 A1* | 4/2002 | Hunzinger | 455/421 |
| 2002/0065080 A1* | 5/2002 | Pittampalli et al. | 455/439 |
| 2002/0077104 A1 | 6/2002 | Chen et al. | |
| 2002/0097780 A1 | 7/2002 | Odenwalder et al. | |
| 2002/0111158 A1* | 8/2002 | Tee | 455/421 |

FOREIGN PATENT DOCUMENTS

| | | |
|---|---|---|
| EP | 0624994 A1 | 11/1994 |
| EP | 1003296 | 5/2004 |
| JP | 10-112877 | 4/1988 |
| JP | 06216901 | 8/1994 |
| JP | 10112877 A | 4/1998 |
| JP | 10191429 | 7/1998 |
| JP | 2000049629 A | 2/2000 |
| JP | 2000151504 | 5/2000 |
| JP | 2000-49629 | 2/2002 |
| JP | 2004-524720 | 10/2002 |
| JP | 2004524720 T | 8/2004 |
| RU | 2285337 | 1/2005 |
| WO | 9805175 | 2/1998 |
| WO | WO9805175 A2 | 2/1998 |
| WO | 9827777 | 6/1998 |
| WO | 0018173 | 3/2000 |
| WO | 0025443 | 5/2000 |
| WO | WO0204702 A2 | 1/2002 |
| WO | 0233982 | 4/2002 |
| WO | WO0233982 A2 | 4/2002 |
| WO | 0247402 | 6/2002 |

OTHER PUBLICATIONS

International Preliminary Examination Report—PCT/US01/044566, IPEA/US—May 12, 2004.
Bonita, Method for Autonomous Handoff in a Wireless Communication System, U.S. Appl. No. 60/216,419, filed Jul. 6, 2000.
Motorola and Denso Contributions to TSG-C TR45.5 3GPP 2 Standards Meeting, Sheraton Kaui, Hawaii. Dec. 4-8, 2000.

* cited by examiner

METHOD AND APPARATUS FOR CALL RECOVERY IN A WIRELESS COMMUNICATION SYSTEM

REFERENCE TO CO-PENDING APPLICATIONS

The present invention is related to U.S. Provisional Patent Application No. 60/251,537 filed on Dec. 5, 2000, entitled "CALL RECOVERY," having assigned to the assignee hereof and hereby expressly incorporated by reference.

FIELD

The present invention relates to wireless voice and data communication. More particularly, the present invention relates to a novel and improved method and apparatus for call recovery in a wireless communication system.

BACKGROUND

A wireless communication system typically includes a plurality of Base Stations (BSs), each associated with a cell and/or sector, communicating with multiple Mobile Stations (MSs). The base stations are controlled by a Base Station Controller (BSC). As a mobile station moves throughout the system the quality of signals received from the base stations fluctuates. When a communication link between a base station and a given mobile station deteriorates, it is possible to prevent losing the communication by establishing a link with at least one other base station. A hand-off process provides for initiation of such alternate communication link(s). In a hand-off situation, the infrastructure negotiates with the various base stations and the mobile station. However, often the signal quality deteriorates too quickly for negotiation to proceed.

There is a need, therefore, for a method and apparatus for call recovery in a variety of situations. Further, there is a need for an reliable method for call recovery in a wireless communication system.

SUMMARY

The disclosed embodiments provide a novel and improved method for recovery distressed calls in a wireless communication system. According to one aspect, in a wireless communication system having a plurality of base stations, each of the plurality of base stations having a neighbor set comprising neighboring base stations, each of the neighboring base stations having a default channel, a method includes transmitting default channel information to a mobile station; detecting occurrence of a call recovery trigger; and instructing all base stations in the neighbor set to transmit on respective default channels.

In one aspect, a wireless apparatus includes an antenna; a processor coupled to the antenna; transmit circuitry coupled to the antenna and the processor; receiver circuitry coupled to the antenna and the processor; a first set of computer readable instructions executable by the processor to receive a list of neighbors for a base station, the list including default channel assignments for each of the neighbors; a second set of computer readable instructions executable by the processor to identify a call recovery trigger and disable a transmit circuitry in response; and a third set of computer readable instructions executable by the processor to establish hand-off with at least one of the neighbors.

In another aspect, a wireless apparatus includes a transmitter circuit; a recovery adjust unit operative subsequent to a call recovery operation to generate a predetermined power control instruction; and a power adjust unit coupled to the recovery adjust unit and the transmitter circuit, the power adjust unit operative to adjust the transmitter circuit in response to the power control instruction.

In still another aspect, a computer program is embodied on a computer-readable medium containing computer-executable instructions, wherein the program includes a first set of instructions operative to identify a special event; a second set of instructions operative to disable call recovery during the special event; and a third set of instructions operative to notify a wireless communication system of the special event.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION OF THE PREFERRED EMBODIMENTS

A method for call recovery in a wireless system according to one embodiment provides information regarding neighboring cells and/or sectors that are available and capable of call recovery for a mobile station that is potentially at risk for losing a communication link. Each of the call recovery-capable base stations has a default forward call recovery channel, identified by a predetermined code. In another embodiment, more than one default forward call recovery channel is assigned per neighbor and the mobile station uses a hash function with IMSI (International Mobile Station Identification), TIMSI (Temporary International Mobile Station Identification), ESN (Electronic Serial Number), system time, or a combination thereof to deterministically decide which channels to use to receive transmissions from each recovery-capable base station. The mobile station then may use that channel to receive signals from a recovery base station. The mobile station may be instructed to combine the power control subchannels from multiple neighboring recovery base stations by overhead messages as the mobile station accesses the base station. This may also occur as the mobile station moves into the coverage area of the base station while the mobile station is in an idle state, i.e. without continuous communication links, by traffic channel messages on call initiation, or upon hand-off when the active set changes for the mobile station.

Figure 1:
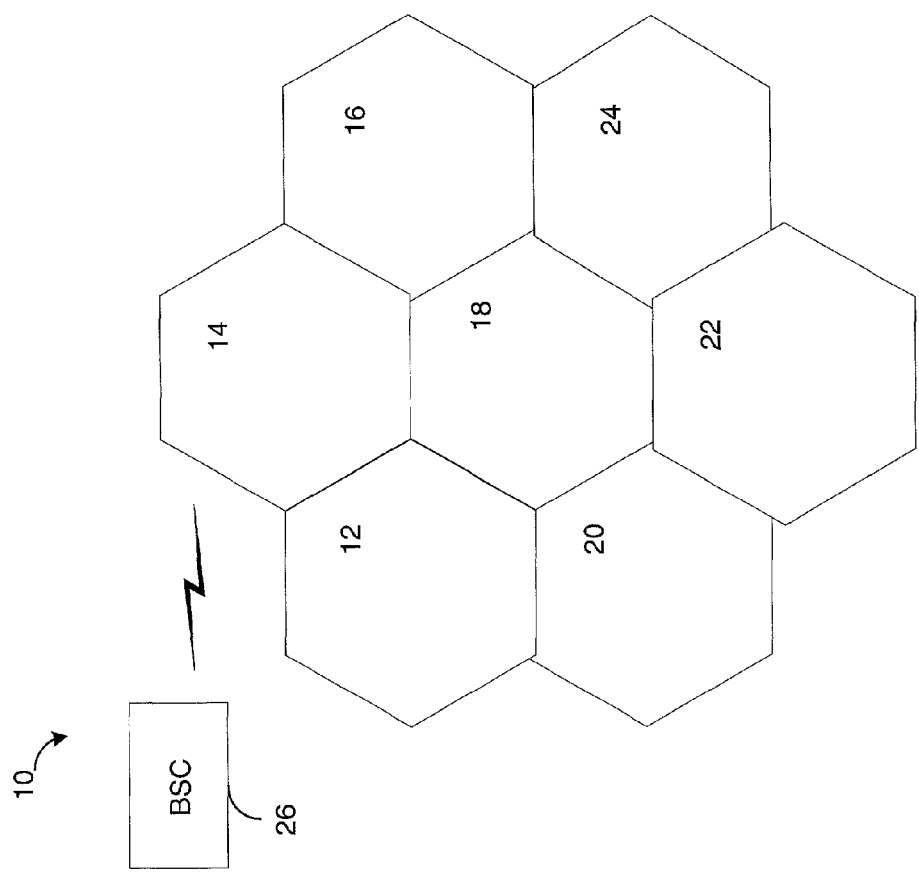
FIG. 1 illustrates in block diagram form a wireless communication system according to one embodiment.

FIG. 1 illustrates a wireless communication system 10 having multiple cells 12, 14, 16, 18, 20, 22, 24. The cells 12, 14, 16, 18, 20, 22, 24 communicate with BSC 26 via a radio air interface. Each of the cells 12, 14, 16, 18, 20, 22, 24 has a corresponding neighbor set, made up of cells within a geographical and/or transmission neighborhood. For example, cell 18 has a neighborhood set including cells 12, 14, 16, 20, 22, 24. In a spread spectrum transmission system, such as a Code Division Multiple Access (CDMA) system specified by the "TIA/EIA/IS-95 Mobile Station-Base Station Compatibility Standard for Dual-Mode Wideband Spread Spectrum Cellular System," hereinafter referred to as "the IS-95 standard," or the "TIA/EIA/IS-2000 Standards for cdma2000 Spread Spectrum Systems," hereinafter referred to as "the cdma2000 standard," spread spectrum signals occupy a same channel bandwidth, wherein each signal has its own distinct Pseudorandom Noise (PN) sequence. Operation of a CDMA system is described in U.S. Pat. No. 4,901,307, entitled "SPREAD SPECTRUM MULTIPLE ACCESS COMMUNICATION SYSTEM USING SATELLITE OR TERRESTRIAL REPEATERS," and also in U.S. Pat. No. 5,103,459, entitled "SYSTEM AND METHOD FOR GENERATING WAVEFORMS IN A CDMA CELLULAR TELEPHONE SYSTEM," both assigned to the assignee of the present application for patent and hereby expressly incorporated by reference. In this way multiple users transmit messages simultaneously over a same channel bandwidth.

Figure 2:
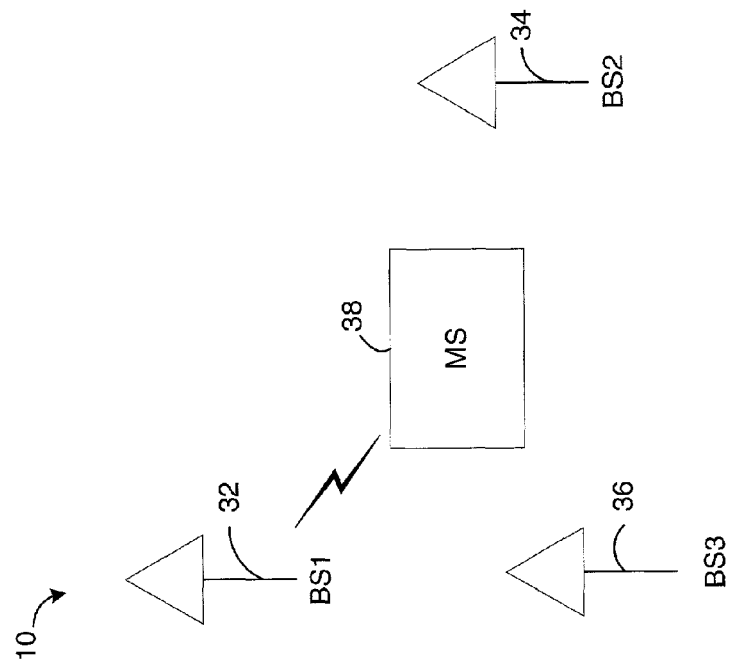
FIG. 2 illustrates in block diagram form a portion of a wireless communication system as in FIG. 1 according to one embodiment.

FIG. 2 illustrates a portion of the system 10 of FIG. 1, including base station 32, labeled BS1, in communication with MS 38. The BS1 32 is within cell 18 of FIG. 1. Two other base stations 34, 36, labeled BS2 and BS3, respectively, are within cells 16, 24, respectively. The radio air interface provides the medium for the Forward Link (FL) for communications from BS1 32 to MS 38, and the Reverse Link (RL) from MS 38 to BS1 32. Note that MS 38 may move within system 10 such that signal quality to and from BS1 32 deteriorates. To start a call, the MS 38 sends transmissions on an access channel. The BS1 32, BS2 34, and BS3 36 send channel assignment messages on a paging channel. The channel assignment identifies the Walsh code index for each base station.

Figure 3:
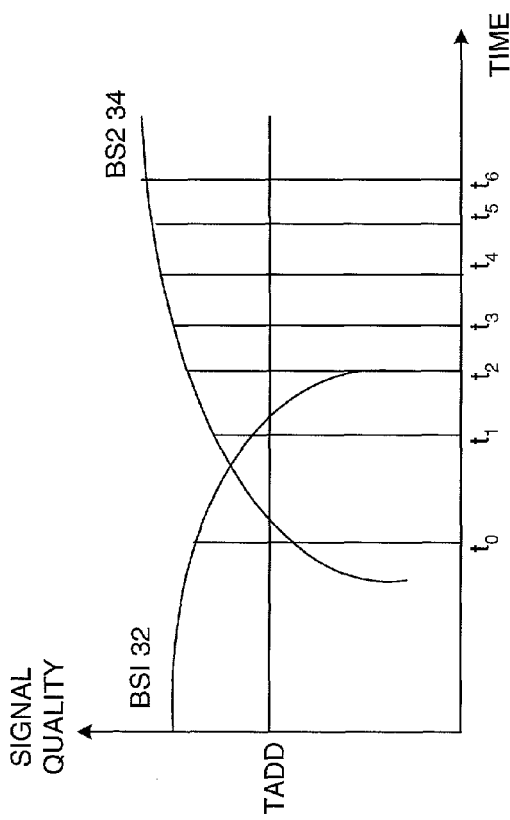
FIG. 3 illustrates in timing diagram form, signal quality of two base stations in a wireless system as in FIG. 2 according to one embodiment.

Signal quality is generally measured as Signal to Noise Ratio (SNR) and may be expressed as pilot signal energy per chip to total received power density ($E_c/I_0$). FIG. 3 illustrates a plot of signal quality as measured at MS 38 for BS1 32 and BS2 34. The signal quality for BS2 34 begins to increase at time t0 and continues to increase above a threshold level, labeled T_ADD, by time t1. The threshold level, T_ADD, provides a reference signal quality above which MS 38 is instructed to notify the base station to add a base station to its Active Set (AS). The AS is made up of base stations that are actively communicating with MS 38, both transmitting and receiving communications. The AS is typically selected from base stations that are in a Candidate Set (CS). The CS includes base stations that are candidates to become active communicators with MS 38. The CS is typically selected from base stations in the Neighbor Set (NS).

Continuing with FIG. 3, while the signal quality of BS2 34 is improving, the signal quality of BS1 32 is deteriorating. The increase in the energy level of the signals received from BS2 34 add to the deterioration of the signals from BS1 32, as the signal quality for a given base station is a comparison of the signal energy from that base station to all other signals present. At time t1, MS 38 measures the signal energy of BS2 34 above T_ADD. This indicates to the MS 38 that appropriate action is required, i.e., is a trigger for hand-off. At time t2 MS 38 transmits to BS1 32 and BSC 26 a Pilot Strength Measurement Message (PSMM) containing measurement information for both BS1 32 and BS2 34. At time t3, BSC 26 sets up a link from BSC 26 to BS2 34 for MS 38. The BSC 26 contains a selector. The BSC 26 sets up a communication link forming a "back haul" communication network between the BS1 32, BS2 34 and BSC 26 with respect to MS 38. At time t4 BS1 32 sends a Handoff Direction Message (HDM) containing information identifying BS1 32 and BS2 34 and their associated code indices for the Forward Link (FL) channels from BS1 32 and BS2 34. This information allows MS 38 to receive and demodulate signals from both BS1 32 and BS2 34. At time t5 MS 38 receives the HDM from BS1 32 and begins to demodulate signals from BS2 34 in addition to those from BS1 32. Note that in this example there is only one new base station involved in the handoff. However, there may be any number of base stations involved in such a handoff situation, wherein those base stations communicating with MS 38 form an AS. When the MS 38 receives signals, including symbols, from multiple base stations in the AS, MS 38 may combine these signals resulting in a stronger signal. The combination process is referred to as "soft combination" of the FL and is usually carried out in optimal ratio combining, i.e., with weighting based on signal quality. At time t6 the MS 38 sends an acknowledgement for the HDM received from BS1 32 or an Handoff Completion Message (HCM) indicating the successful completion of the handoff.

Referring again to FIG. 3, a situation may arise wherein the signal quality of BS2 34 increases too quickly. In this case, the signal strength of BS2 34 with respect to that of BS1 32 encourages deterioration of the signal quality of BS1 32. The MS 38 is hindered from communicating with the infrastructure prior to receiving information necessary for hand-off, such as the Pseudorandom Noise (PN) offset necessary to identify BS2 34 or the channel used by BS2 34 for MS 38.

In a typical CDMA hand-off process, as a mobile station moves from the coverage area of one base station to the coverage area of another base station, hand-off prevents loss of the communication link. In one type of hand-off, soft hand-off, the mobile station simultaneously maintains connections with two or more base stations. The current location of the mobile station may be considered the source cell, while the next cell that the mobile station moves to may be referred to as the target cell. The mobile station uses a rake type receiver to demodulates the multiple signals received on the FL of the multiple base stations. The two signals are combined resulting in a composite signal with improved quality. While each of the multiple base stations involved in soft hand-off demodulates the signal received separately, each sends the demodulated and decoded information to a BSC. The BSC contains a selector that selects the best frame from the multiple frames received. Other types of hand-off may be used for a variety of conditions and system requirements.

In Mobile-Assisted Hand-Off (MAHO), the mobile station makes a measurement of the signal quality for the FL pilot signals from multiple mobile stations. This information is reported to the source base station. The signal qualities are compared to various thresholds to make decisions for adding base stations to the AS. If the signal quality of a given pilot is greater than a pilot detection threshold, T_ADD, then the pilot is added to the AS. In an alternate embodiment, the pilot may be added to the CS first and then to the AS. In effect, the threshold allows for transfer of the status of a base station from one set to another.

Call recovery provides information to the mobile station ahead of time, in the case when hand-off negotiation is not possible. Call recovery is initiated in a variety of situations. In normal operation the mobile station and the base station use triggers to determine their proper operation. For example, mobile stations operating within system 10 use a variety of thresholds for decision making with regard to what information is reported back to the base station. One threshold, discussed hereinabove, T_ADD, indicates a signal quality level for adding a base station to the AS. When the mobile station receives a signal that measures above T_ADD, the mobile station moves that base station into the CS, searches more frequently for that base station, and reports this condition to the system through its existing AS. Another threshold, T_DROP, provides a signal quality level below which a base station will be dropped from the AS. When the mobile station receives a signal that measures below T_DROP for a duration longer than T_TDROP, the mobile station reports this condition to the system through the existing AS. In each case, the base stations in the AS relay this information to a base station controller.

For call recovery, the base station in an AS looks for any of a variety of possible triggers. A first type of call recovery trigger occurs when the FL signal quality is below a threshold level for a duration longer than another threshold. This type of trigger includes when the base station receives continuous Power Control (PC) requests from the mobile station to increase the transmit level at the base station. Often the base station is already transmitting to the mobile station at a maximum ceiling power level. For example, the FL traffic transmission is maintained at a high level for a predetermined time period. The mobile station may send many requests to increase the power, i.e., UP commands. Alternately, the mobile station may report an abundance of erasures. An erasure occurs when more than a threshold level of bits are received without confidence of the intended value. In another case, the mobile station transmits messages indicating to the base station that its outer loop set-point is high or at its maximum allowed level, or at those levels for an extended time.

A second type of trigger occurs when a certain response is expected from the mobile station, but no response, or a different response, is received. This type of trigger includes lack of acknowledgement from the mobile station to a message sent by the base station that requires an acknowledgement. The message may be re-sent a predetermined number of times prior to satisfying the trigger. This predetermined number may be fixed or variable and changeable over the air. Similarly, the base station may receive repeated RL messages from the mobile station that require an acknowledgement, wherein the messages are received subsequent to base station transmission of an acknowledgement.

A third type of trigger relates to low quality of the reverse link, e.g., when the Frame Error Rate (FER) of the RL is above a threshold level. Alternately, the RL may be maintained at a high level for a predetermined time period. Still another situation may have a high RL set-point. The base station to be added to an AS also has call recovery triggers that initiate recovery action. The most significant trigger is a notification from the BSC that a potential problem exists with a given mobile station. On such an occurrence, the base station begins to search for signals from the mobile station.

The mobile station may also use a variety of call recovery triggers to enter call recovery. A first type of trigger occurs when there are abnormal number of errors in the received signals. For example, FL erasures over a moving window may exceed a predetermined threshold level. In one embodiment, the threshold level is 12 consecutive frames experiencing erasure. In this case, the mobile station will turn off the transmitter portion of the mobile station, and may turn the transmitter back on when at least two FL consecutive frames have no erasures.

A second type of recovery trigger for the mobile station occurs when the mobile station receives PC commands from the base instructing increases in power. The base station may be having difficulty receiving the RL signals due to large path losses from the mobile station.

A third type of recovery trigger occurs when one or more RL messages that require acknowledgement from the base station are not being acknowledged. This is referred to as retransmission retry trigger. Similarly, there may be an inappropriate response or no response from the base station to a message from the mobile station. A similar type of trigger occurs on receipt of repeated FL messages requiring an acknowledgement, subsequent to the mobile station actually transmitting the acknowledgement.

A fourth type of recovery trigger occurs when the mobile station transmits at a high level for a predetermined time period. In this case it is assumed that the RL is not getting through to the base station with sufficient energy.

In one embodiment, flexible thresholds are implemented for the one or multiple of the various call recovery triggers. The call recovery triggers may be based on multiple attempts to transmit within a system 10. These attempts are often made in the link layer between signaling and the physical link. The link layer is referred to as Layer 2, and is discussed hereinbelow with respect to FIG. 8. In recovery-capable systems, such as system 10 of FIG. 1, MS 38 performs a recovery procedure to maintain a call when the communication link, such as the FL, is deteriorating. A trigger often initiates a recovery operation, wherein the trigger indicates when a parameter or metric passes a threshold. These thresholds may be dynamic, adapting to conditions of the system 10 and environment. Similarly, the thresholds may be adjusted based on a history or statistical record of operation of the system 10.

In one embodiment, the number of repeated transmissions on the RL, or the time between consecutive erasures, or the disabling of MS 38 transmitter may be in response to an instruction transmitted from the system 10 infrastructure, such as BS1 32 and/or BSC 26. In an alternate embodiment, a fixed parameter is defined for the particular action, such as a specified maximum number of allowable retransmissions. In another embodiment, the mobile condition and/or location provides a trigger. The proximity of the current transmit level of MS 38 to a predetermined maximum value may trigger call recovery. Other triggers include the quality of the FL as measured by erasures of transmissions in the current AS, a deficit in inner loop power control, wherein the MS 38 desired SNR is different from that provided by the inner loop, etc. Still other embodiments may combine the specific parameter and the mobile condition as triggers.

The system 10 infrastructure may provide the MS 38 with operational type information helpful in determining the thresholds of call recovery triggers, and may use such information in selecting fixed parameters provided to the MS 38 to use as trigger thresholds. In one embodiment, the typical number of re-tries by call that are experiencing trouble or have been dropped. An alternate embodiment uses the loading of the RL to set and adjust thresholds. Still alternate embodiments may use the location of MS 38 within the system 10, such as the sector of a given cell. Still other embodiments consider the day of the week and/or time of day in coordination with known mobile traffic patterns. A combination of any of these mechanisms may also be implemented where applicable or needed.

In the system 10, of FIGS. 1 and 2, each base station, 32, 34, 36 transmits overhead information to mobile stations with which it communicates. The overhead information for each BS 32, 34, 36 includes its respective neighbor list. The neighbor list identifies the corresponding Pseudorandom Noise (PN) code offsets of the neighbors.

Figure 4:
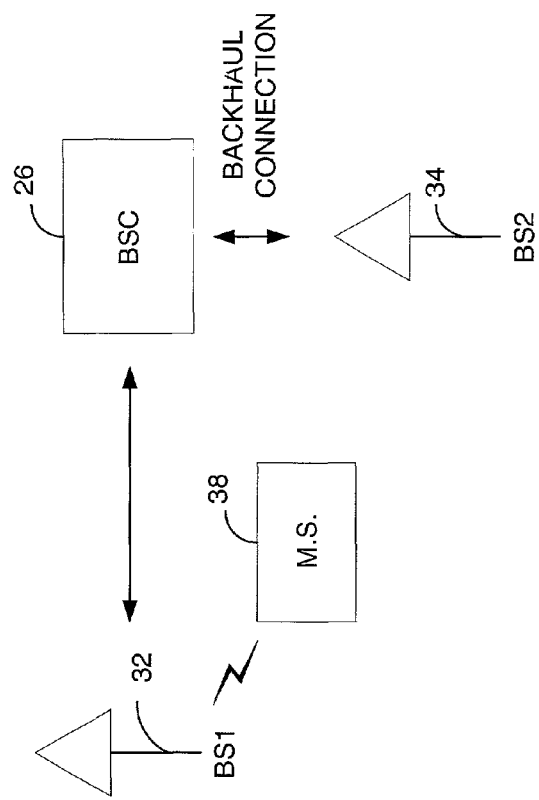
FIG. 4 illustrates in block diagram form a portion of a wireless communication system as in FIG. 1 during recovery according to one embodiment.
Figure 5:
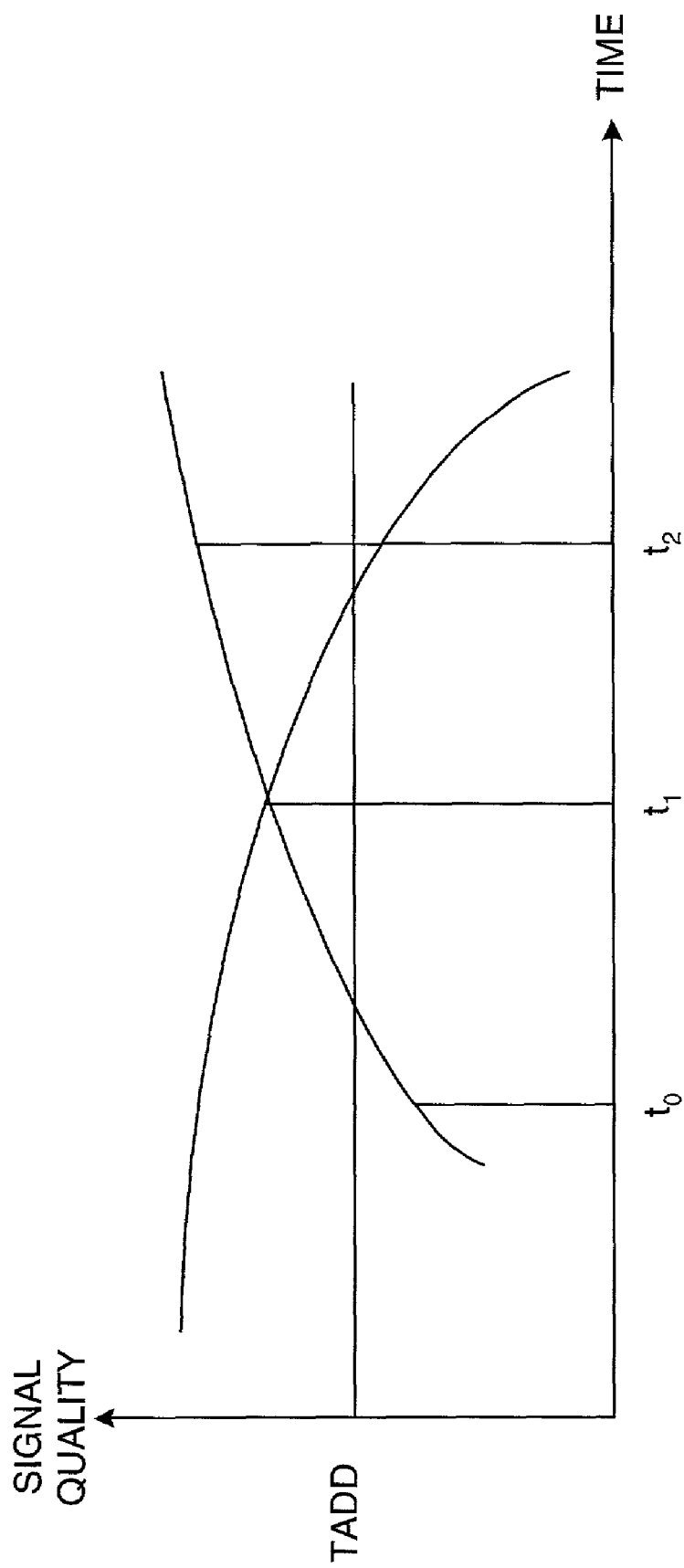
FIG. 5 illustrates in timing diagram form, signal quality of two base stations in a wireless communication system according to one embodiment.

Referring to FIG. 4, BSC 26 responds to any of the variety of triggers by setting up a backhaul connection with BS1 32 and BS2 34. In accordance with one embodiment, method 100 of call recovery is initiated as illustrated in FIG. 6. The particular signal quality plot for one example is illustrated in FIG. 5. In this example, there is time to identify MS 38 as having a potential problem.

Figure 6A:
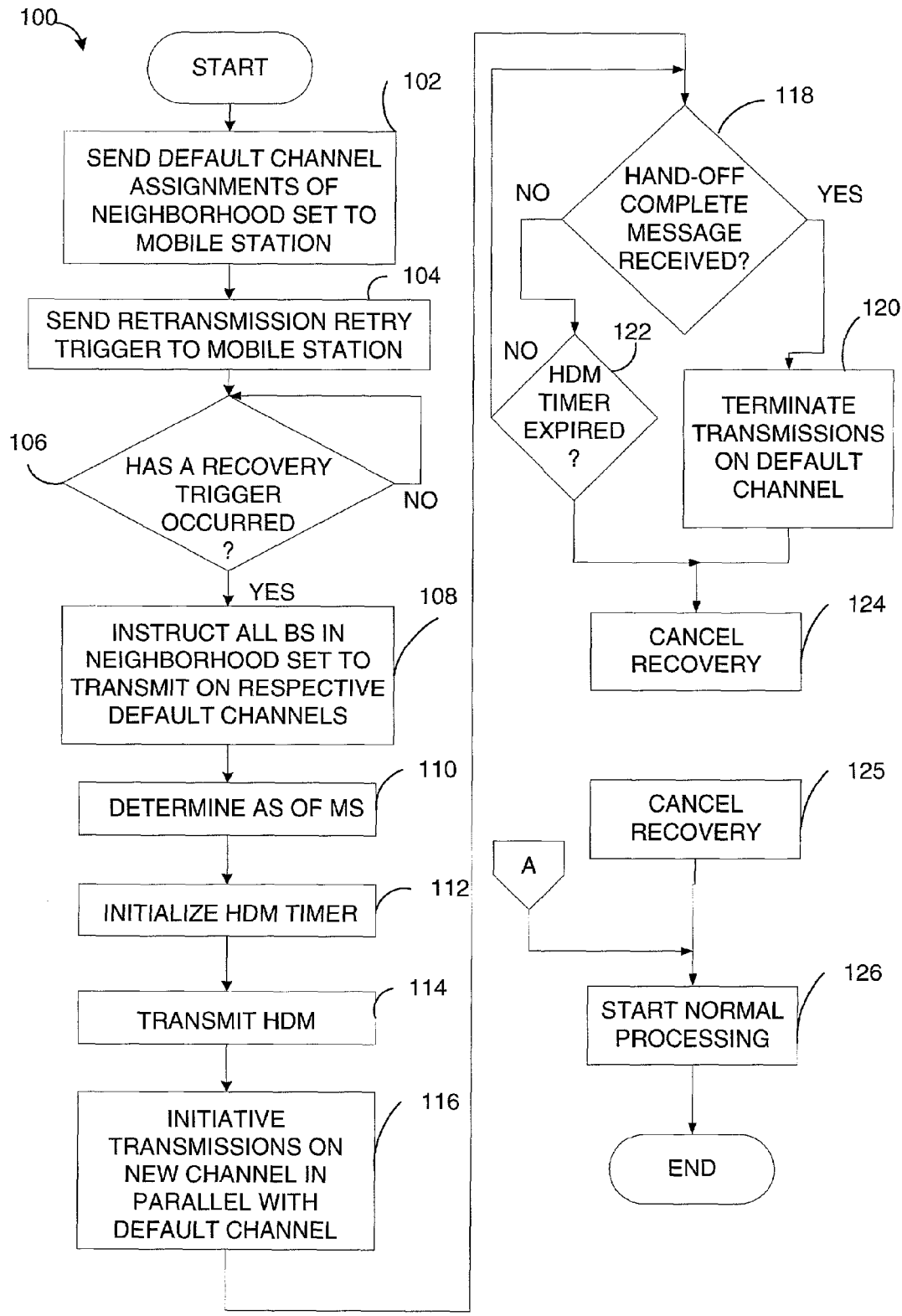
FIGS. 6A and 6B illustrate in flow diagram form a method for call recovery at a base station according to one embodiment.
Figure 6B:
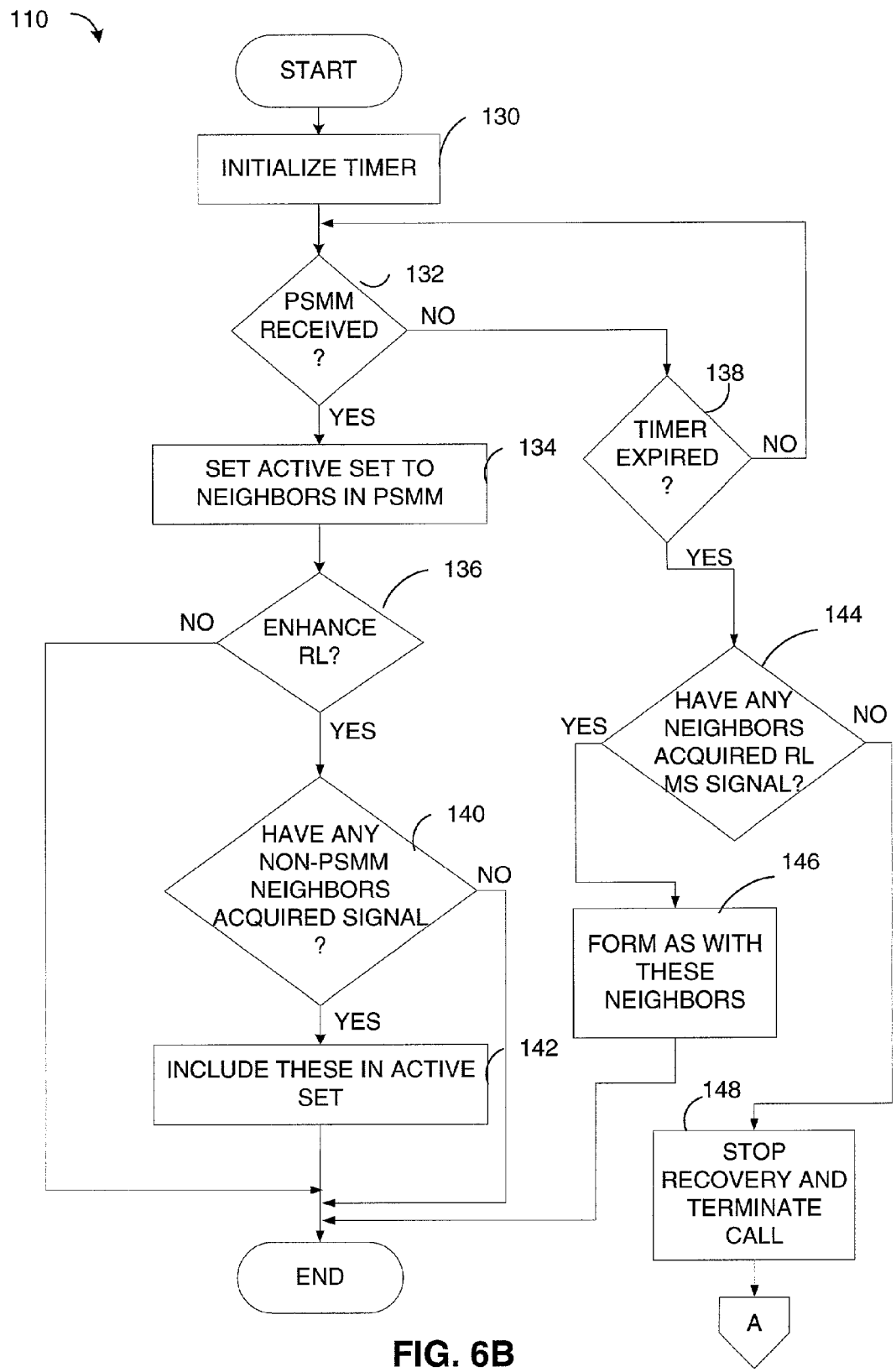

In the call recovery method 100 of one embodiment, illustrated in FIGS. 6A and 6B, at step 102 BS1 32 sends default channel assignments for the set of neighboring base station(s) to MS 38. The base stations in the neighbor set are recovery-capable units, having the necessary software and/or hardware to implement a call recovery and having coverage area(s) overlapping that of the base station sending the neighbor set. The default channel assignments identify the default channel code index used by base stations within the neighbor set, including the code for BS2 34. Each of the base stations in the neighbor set that are recovery-capable have a default spreading code that will be used to identify a mobile station in need of call recovery. The spreading code of one embodiment is a specific Walsh code. The BS2 34 sends a retransmission retry trigger to the MS 38 at step 104. The retransmission retry trigger dictates the number of retries that the MS 38 is to allow prior to initiating call recovery operations. The BS1 32 then determines if a recovery trigger has occurred at decision diamond 106. If a recovery trigger has not occurred, processing waits for occurrence of a trigger. On the occurrence of a trigger, processing continues to step 108 to instruct all base stations in the NS of BS1 32 to transmit on their respective default channels corresponding to the MS 38. Note that some of the base stations within the NS may not be able to establish a communication link due to the weakness of the FL or RL, however, each base station within the NS begins to transmit to the MS 38. The multiple transmissions provide a stronger FL signal at the MS 38 and a more reliable RL to BSC 26.

Note that according to the present embodiment, the number of retries of an RL message, or the amount of time allowed for consecutive erasures, are determined by the BSC 26 and provided to the MS 38 via radio link dedicated messages and broadcasts. An alternate embodiment uses a fixed parameter, distinct from other parameters. One embodiment incorporates a function of the mobile conditions. Mobile conditions may consider how close the actual transmission level of MS 38 is in comparison to a maximum transmit level. Similarly, another mobile condition considers the quality of the FL, such as erasures on the current AS. Still another mobile condition considers an inner loop deficit. The inner loop deficit is the difference between a target SNR and the SNR delivered by the inner loop PC. Another embodiment combines the mobile condition with the type of transmission.

The allowable number of retries may be adjusted according to statistics relating to dropped calls or troubled calls. For example, there may be an average number of retries above which a majority of troubled calls do not recover. Other considerations include the RL loading, the location of MS 38, and/or the time of day, or date. In the latter case, certain mobile traffic patterns affect the number of mobiles requiring a fast call recovery.

Continuing with FIG. 6A, the BSC 26 determines the current AS of MS at step 110. The BSC 26 then initializes an HDM timer at step 112 and transmits the HDM at step 114. At this point, the system 10 desires to move the communication links off the default channels. The default channels are available for use by any of the mobile stations within system 10 and therefore, use is to be optimized. While MS 38 utilizes a given default channel, that channel is not available for use by another mobile station. The base stations in the NS are instructed to initiate transmissions on an alternate or new channel in parallel with the transmissions on the default channel. This is the initiation of a hand-off condition.

If the BSC 26 has received a message from the MS 38 indicating the hand-off is complete at decision diamond 118, processing continues to step 120 to discontinue the MS 38 communication links with members of the NS on the default channels. Processing then continues to step 124. Conversely, if the hand-off complete message is not received, the BSC 26 checks if the HDM timer has expired at decision diamond 122. If the HDM timer has expired, the appropriate default channel terminates transmissions to MS 38, call recovery is cancelled at step 124, and usage of both the default channel and the new channel is discontinued at step 125. The normal operation resumes at step 126. If the timer has not expired at decision diamond 122, processing returns to wait for the hand-off complete message from MS 38 at decision diamond 118.

FIG. 6B details a portion of method 100, wherein the step 110 is illustrated as initializing a timer at step 130. The BSC 26 checks for a PSMM from MS 38 at decision diamond 132. If the PSMM has been received, processing continues to step 134 to set the AS to include neighbors included in the PSMM. If no PSMM is received, processing continues to decision diamond 138 to determine if the timer (initialized in step 130) has expired. If the timer has expired, processing continues to decision diamond 144. If the timer has not expired, processing returns to decision diamond 132.

After the AS is set at step 134, if the RL is to be enhanced at decision diamond 136, BSC 26 determines if there are any neighbors not included in the PSMM that have acquired the MS 38 signal(s) at decision diamond 140. These neighbors are referred to as Hearing Neighbors (HN), and are added to the AS at step 142. Processing then returns to step 112 of FIG. 6A.

If the timer expired without receiving a PSMM, BSC 26 determines, at decision diamond 144, if any neighbors acquired the RL MS 38 signal(s), i.e., HN. In this case, the AS is set to include these HN at step 146. If no HN is found at decision diamond 144, then call recovery terminates at step 148 and the call is terminated.

At decision diamond 110, the method determines if the transmitter of MS 38 is turned off. If the transmitter is off, the BSC 26 instructs the MS 38 to turn the transmitter on at step 110.

Figure 7A:
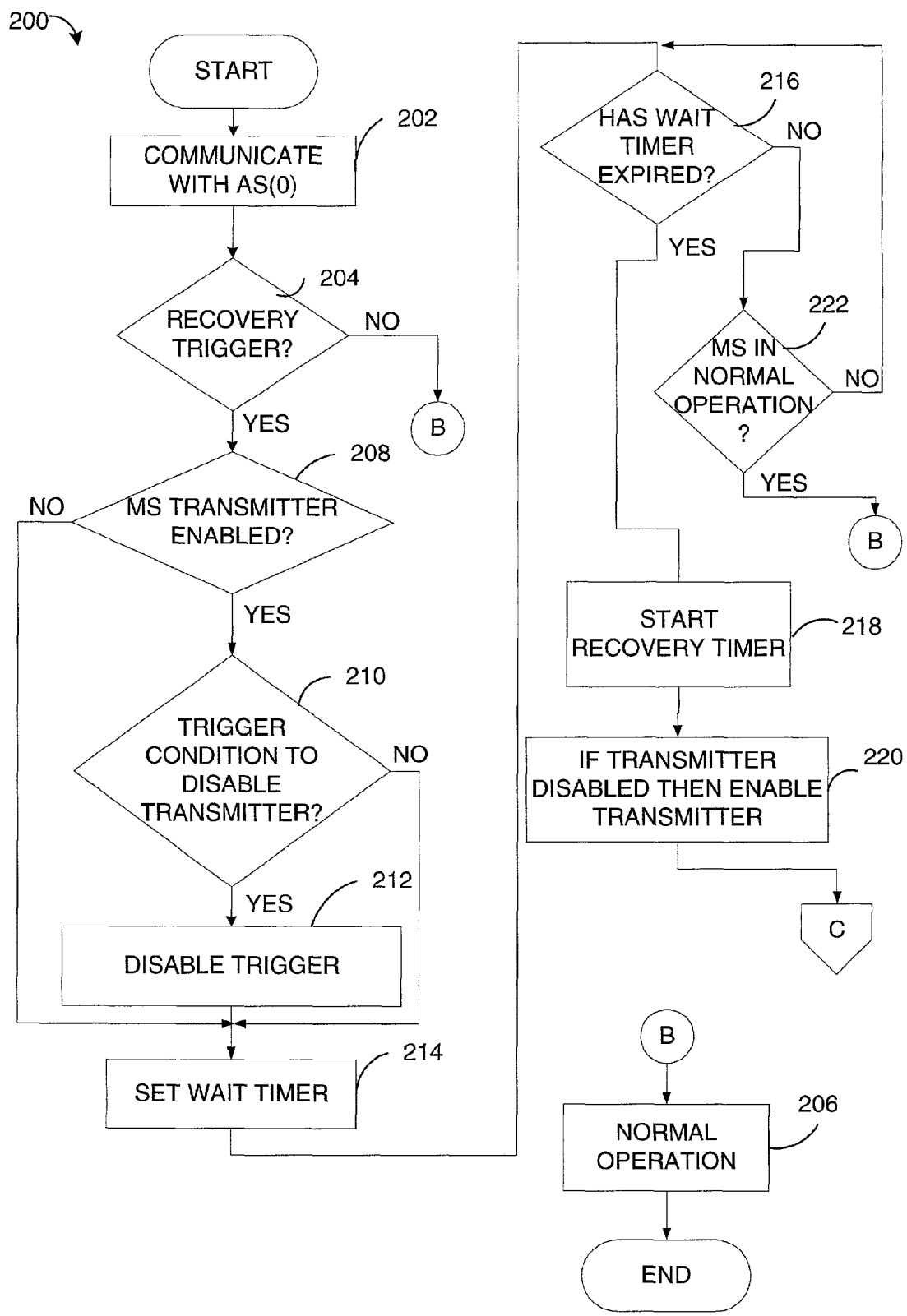
FIGS. 7A and 7B illustrate in flow diagram form a method for call recovery at a mobile station according to one embodiment.
Figure 7B:
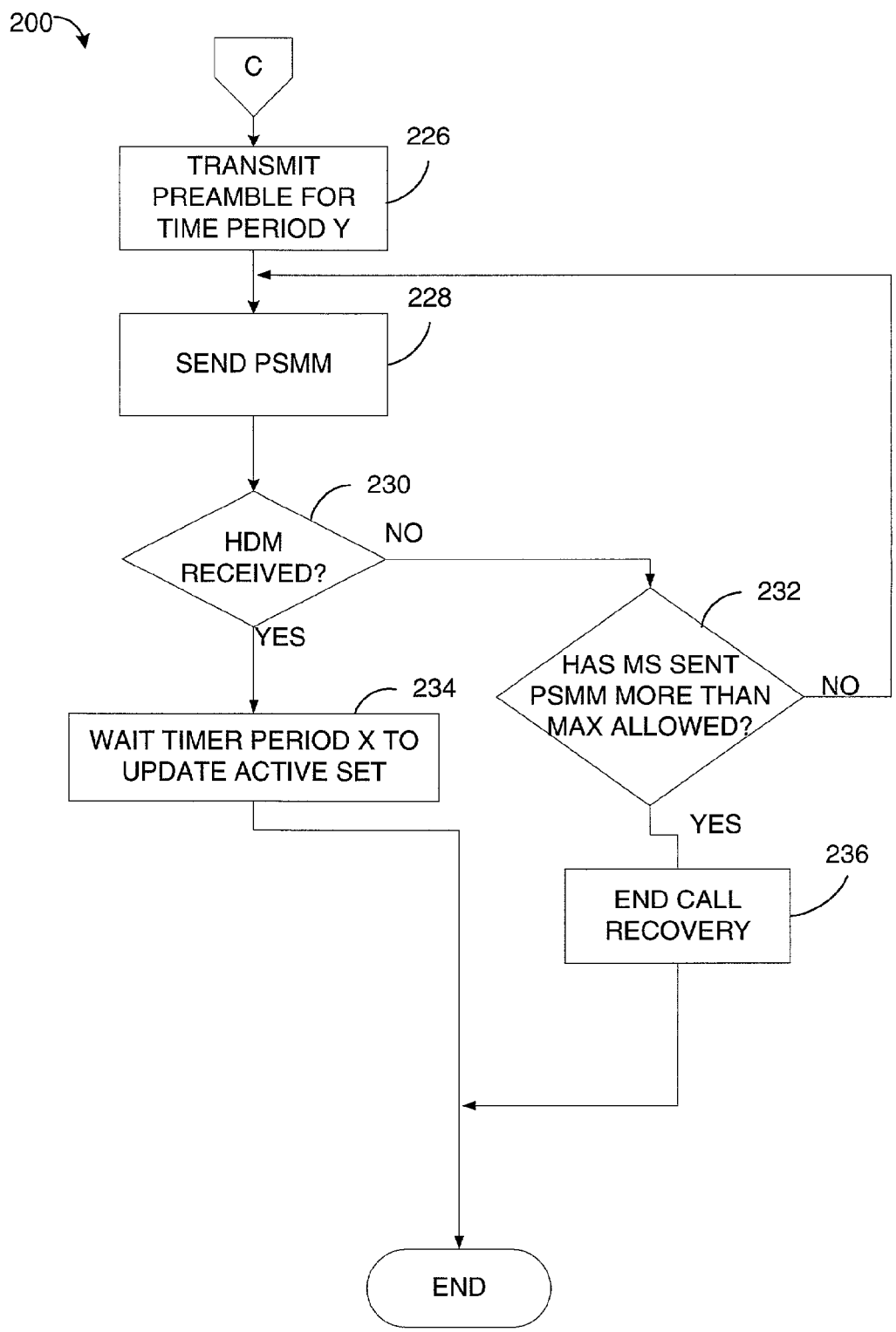

A mobile station call recovery method 200 for one embodiment is illustrated in FIG. 7. At step 202 the MS 38 communicates with base stations in the AS(0). This identifies the current AS. If a recovery trigger has occurred at decision diamond 204, processing continues to decision diamond 208.

The recovery trigger could be one of those discussed hereinabove, or an alternate indication that the MS 38 requires a rescue type operation, i.e., MS 38 is probably losing the FL communication link. If no trigger occurs, normal operation resumes at step 206. Decision diamond 208 determines if the transmitter of MS 38 is enabled. If the transmitter is enabled, processing continues to step 214, and if not, the MS 38 checks for a trigger condition at decision diamond 210. If a trigger condition exists that indicates MS 38 is to disable the transmitter, then appropriate action is taken at step 212 and processing continues to step 214. If no trigger indicates that the transmitter is to be disabled, then processing continues to step 214. At step 214 a wait timer is set. The wait timer is checked at decision diamond 216, and on expiration the recovery timer is started at step 218. If the wait timer has not expired, then processing continues to determine if the MS 38 has returned to a normal operating mode at decision diamond 222. Normal operation continues from step 206, else processing returns to wait for expiration of the wait timer.

Continuing with FIG. 7, from step 218 if the transmitter of MS 38 is disabled, at step 220 the transmitter is enabled. The MS 38 transmits a predetermined preamble for time period Y. The preamble provides information about the MS 38 transmission but no actual data or symbols. The MS 38 transmits the PSMM information at step 228. At decision diamond 228, if the HDM is received or if some acknowledgement is received confirming the PSMM, the MS 38 proceeds to wait a predetermined time period X, after which the AS is updated. If no HDM or PSMM acknowledgement is received at decision diamond 230, processing continues to decision diamond 232 to check that the PSMM has not been transmitted more than a maximum allowable number of times. If the PSMM can be resent, i.e., the maximum has not been reached, processing returns to step 228 and the PSMM is resent. However, if the maximum has been reached, processing continues to step 236 and the call recovery is terminated.

According to an alternate method of call recovery, BSC 26 notifies all of the recovery-capable neighbors of BS1 32 of a potential problem. The BSC instructs the MS 38 to turn on the transmitter portion of MS 38 and instructs the base station(s) in the neighbor set to listen for the MS 38. On detection or acquisition of a signal from MS 38 each base station in the neighbor set transmits a report. The reports are received from a subset of base stations, wherein the subset may include all base stations in the neighbor set or a portion of base stations. The BSC 26 notifies the MS 38 of the default channels of each base station in the subset. The base stations of the subset then use the appropriate default channel to initiate communication with MS 38.

In still another method, a subset of the neighbor set is determined based on a most recently transmitted PSMM. A problem exists in that the last transmitted PSMM may not have been received correctly, in which case the PSMM used to identify the subset is incorrect. As an example, when the last received PSMM identifies BS1 32 and BS3 36, but MS 38 sent a subsequent PSMM identifying BS1 32 and BS2 34 that was not received, call recovery is thwarted. The BSC 26 sets up a backhaul network with BS3 36 and BS3 36 begins transmissions to MS 38 on a default channel. Unfortunately, MS 38 assumes that communication will be established with BS2 34 for call recovery and prepares to except on a different default channel. The excess transmission from BS3 36 is wasted and effectively creates more noise in the system 10.

When the call recovery is initiated by the MS 38, a timer may be used to delay such initiation subsequent to occurrence of a call recovery trigger. The time period of the timer may be sets by the BSC 26. On expiration of the timer, the MS 38 transmits a preamble on a RL pilot channel. The preamble includes a call recovery message. In one embodiment, the preamble is a predetermined constant that may be set by BSC 26. In an alternate embodiment, the preamble is a variable length determined by the system operator. Subsequent to transmission of the preamble, MS 38 sends a message regarding the FL change(s). The message may be a PSMM. The message may be sent a number of times to ensure receipt by BS2 34.

Combinations of the above methods provide various advantages for call recovery. In one embodiment, a call recovery method is based on the radio transmission environment of the source cell base station. When the number of neighbors that are recovery-capable is small, e.g. 2, the BSC 26 will instruct all of the neighbors to transmit on respective default channels. The AS is updated and the MS 38 transmitter is enabled without a delay. For larger sets of neighbors that are recovery-capable, the BSC 26 will instruct the neighbors to listen for signals from MS 38. After a delay incurred in waiting for the neighbors to report on whether they can receive signals from MS 38, those hearing neighbors are instructed to use the default channels. Similarly, if a PSMM is received from MS 38 within a predetermined time period, those base stations identified by the PSMM are instructed to use default channels. Note that when the FL is operating properly, as defined by a fixed number of consecutive good frames, the PC commands sent via the PC subchannel are considered valid.

Figure 8:
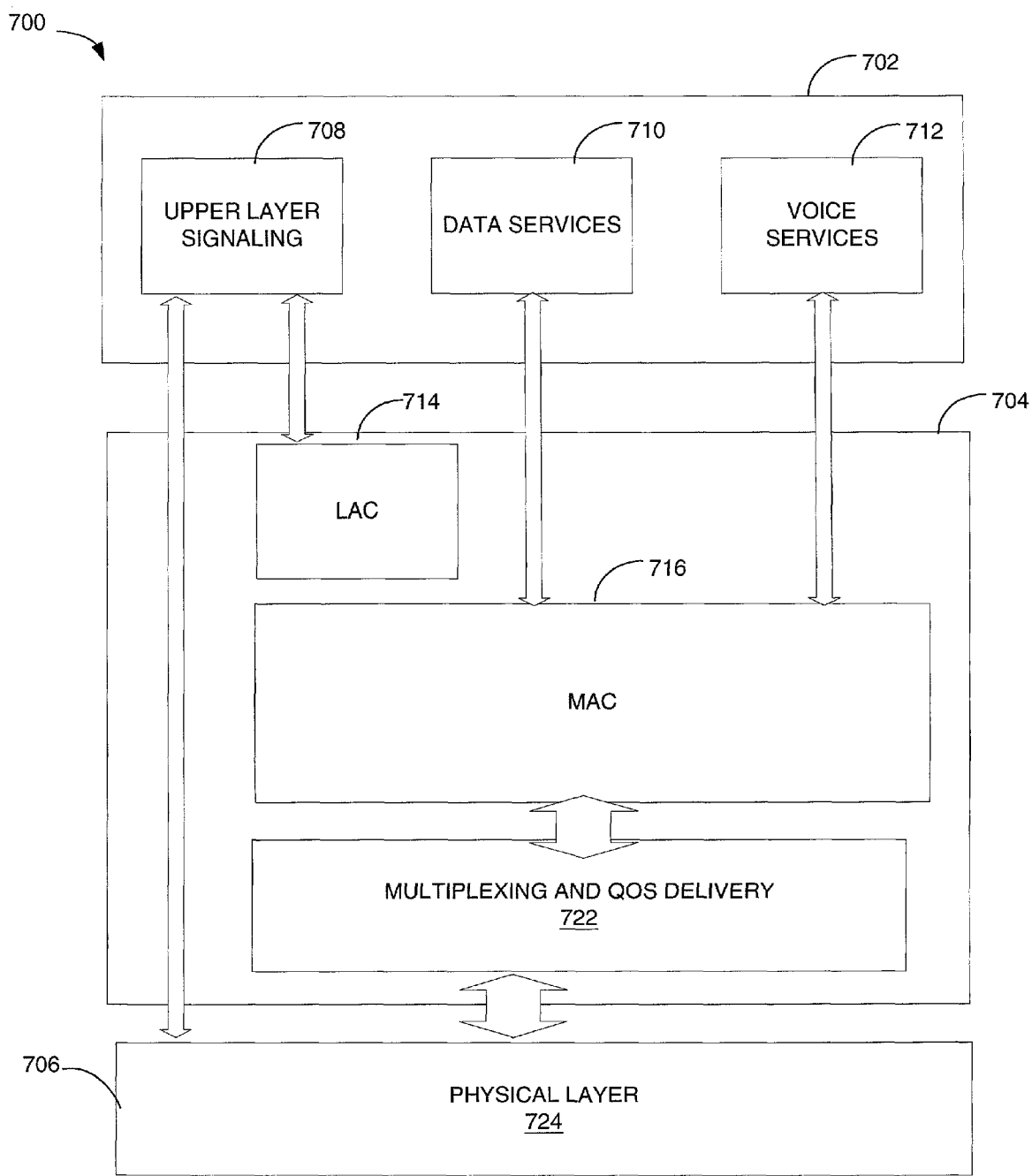
FIG. 8 illustrates in block diagram form architecture layers of a system as in FIG. 1 according to one embodiment.

FIG. 8 illustrates the architecture of wireless communication system 10 of FIG. 1 in a layer structure format. The architecture 700 includes three layers: a signaling layer 702; a link layer 704; and a physical layer 706. The signaling layer 702 provides upper layer signaling 708, data services 710, and voice services 712. The signaling layer 702 provides for voice, packet data, simple circuit data, and simultaneous voice and packet data services. Protocols and services are provided at this layer corresponding to the bottom two layers. The link layer 704 is subdivided into a Link Access Control (LAC) sublayer 714 and a Medium Access Control (MAC) sublayer 716. Applications and signaling layer 712 protocols utilize the services provided by the LAC sublayer 714. The link layer 704 serves as an interface between the upper level protocols and applications of the signaling layer 702 and the physical layer 706. The MAC sublayer 716 further includes multiplexing and Quality of Service (QoS) delivery block 722. The link layer 704 couples the signal layer 702 to the physical layer 706. The physical layer 706 is made up of the physical channel 724 of transmission.

Figure 9:
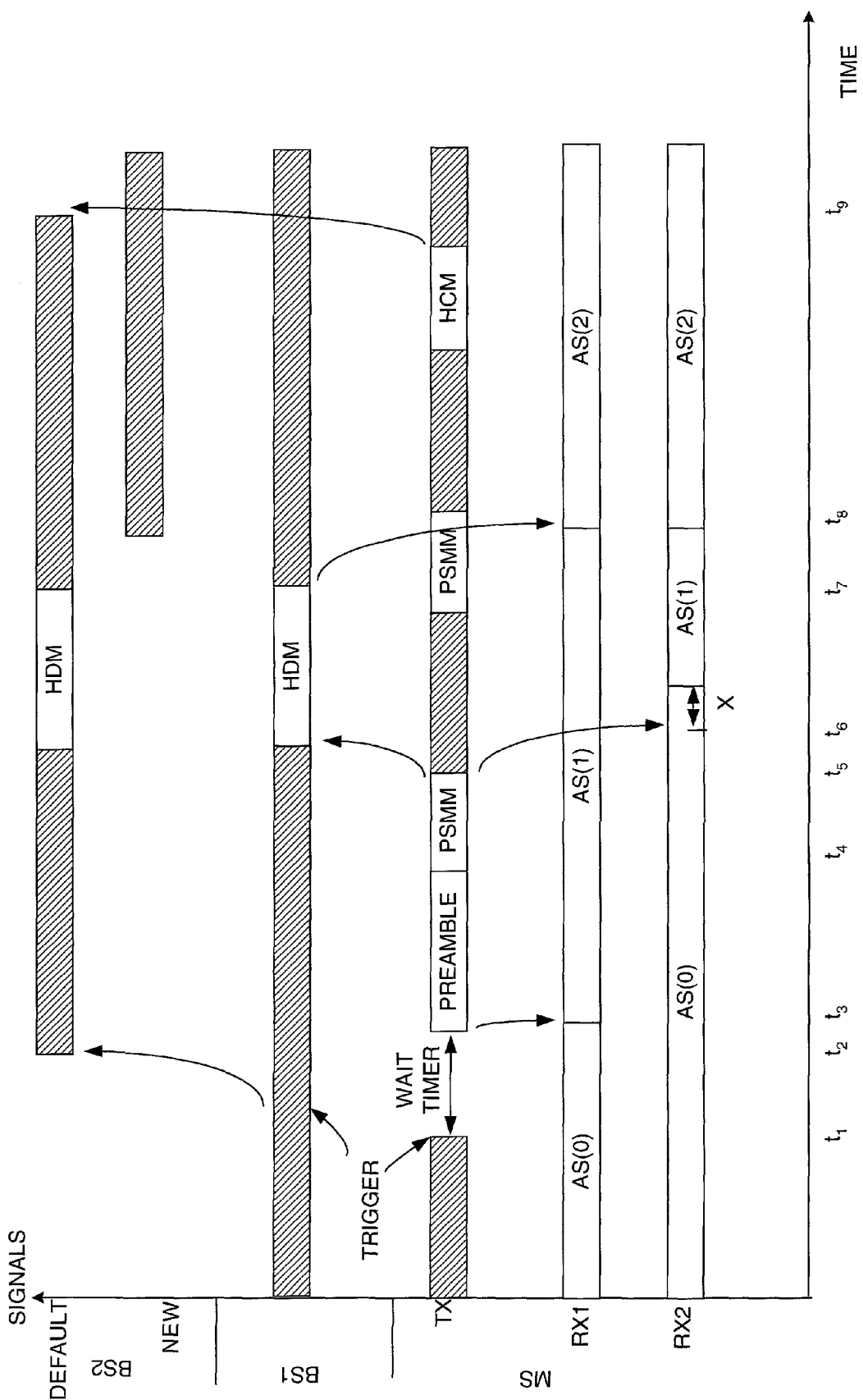
FIG. 9 illustrates in timing diagram form call recovery operation of a system as in FIG. 1 according to one embodiment.

FIG. 9 provides a timing scenario for operation of the system 10 of FIG. 1 according to one embodiment. Reference is made to the methods of FIGS. 6A, 6B and 7. The horizontal axis represents time and the vertical axis represents the various channels used for transmission. The source cell base station, BS1 32 is provided in the middle, where information is transmitted via a traffic channel to MS 38. Two channels are illustrated for the MS 38: a transmission channel Tx; and a receiver channel Rx. Two scenarios are illustrated for the receiver channel: $Rx_1$ and $Rx_2$. Also illustrated in a neighbor base station that is a target base station, BS2 34. The default channel and a new channel are both illustrated. The new channel is the channel to be used for communication with MS 38 after hand-off. Processing begins with MS 38 receiving transmissions from a first AS, identified as AS(0). The MS 38 is simultaneously transmitting on a traffic channel for the source cell BS1 32. At time t1 a call recovery trigger occurs. Both MS 38 and BS1 32 recognize the trigger. Note that the trigger may be a common event, such as continued PC requests from MS 38 to BS1 32 to increase the transmit power of the FL, or may be separate events for the MS 38 and the BS1 32. Also, the MS 38 and the BS1 32 may not recognize the trigger(s) at the same time. Often the MS 38 may be in a position to recognize a trigger prior to BS1 32 during FL failures.

When the trigger is identified at time t1, the BSC 26 initiates a default channel transmission from the neighbor BS2 34. At time t2 BS2 34 begins transmitting on the default channel to MS 38. The transmission is parallel with the same transmission from BS1 32. On occurrence of the trigger, the MS 38 disables the transmitter for a predetermined wait time period. At time t3 the wait period ends and the MS 38 transmits the preamble for a time period Y. At the same time, the AS of MS 38 is changed from AS(0) to AS(1). The base stations identified in the AS(1) are all the base stations cited in the last PSMM. In an alternate embodiment, the AS(1) may be all of the neighbors of BS1 32 and BS1 32 itself.

At time t4 the preamble terminates, and the MS 28 begins transmitting the current PSMM. In response to receipt of the PSMM at time t5, the BS1 32 and the BS2 34 transmit an HDM at time t6. The HDM signals the change of the AS to AS(2) at time t8. Note that a next PSMM is sent at time t7, wherein PSMM are sent periodically or continuously to identify signals received at the MS 38.

At time t8, the BS2 34 begins transmission on the new channel for MS 38. The MS 38 transmits an HCM which triggers the termination of transmissions for MS 38 on the default channel at time t9. In one embodiment, the HCM is transmitted periodically or continuously until its correct reception is acknowledged by the base station. In the scenario illustrated in FIG. 9, call recovery begins at time t2 and terminates at time t9. At time t9 hand-off is completed and BS2 34 is current source cell base station for MS 38.

An alternate scenario is illustrated for receiver channel Rx$_2$. Here the AS(0) remains active until time t5. Subsequent to time t5, the MS 38 continues to receive from AS(0) for a predetermined time period X, after which there is a change to AS(1). This allows for extra time for the base station side to determine on a subset of the recovery-capable neighbors of BS1 32 for the transmission to MS 38 for recovery. At time t8 there is a subsequent change in response to the HDM from AS(1) to AS(2). This scenario corresponds to the method wherein only those neighbors able to acquire signals from the MS 38 are instructed to transmit via respective default channels.

Once call recovery is completed and the hand-off has been accomplished, the MS 28 must determine an initial transmission power level. According to one embodiment, the system 10 of FIG. 1 uses a closed loop power control for adjustment of transmission power levels. Alternate embodiments may use an additional open loop method of power control. Open loop refers to transmitter (either mobile or base station)-controlled operation where the receiver is not directly involved. For example, a particular reverse link open loop power control calls for the mobile to adjust reverse link transmit power based on the power level of signals received from the base station via the forward link. Closed loop power control expands open loop operation whereby the receiver actively participates in making the power adjustment decision. For example, for RL closed loop power control the base station compares the power level of signals received from a given mobile to a threshold value. The base station then instructs the mobile to increase or decrease the reverse link transmit power based on the comparison. Conversely, the mobile monitors the power level of signals received on the FL, and provides feedback on the quality of the FL to the base station. Closed loop operation is used to compensate for power fluctuations associated with fading, such as Raleigh fading, of a given link.

Immediately after wait timer expires and prior to the establishment of power control, the MS 38 begins transmitting at an initial power level. The RL transmit power level may resume from just prior to disabling the transmitter of MS 38. The power level may remain at this initial level until closed-loop power control resumes.

In an alternate embodiment, the power level is initiated at the last level prior to disabling the transmitter and then gradually increased at a predetermined rate until power control resumes. The speed of the increase is typically set by the BS1 32 and/or BS2 34, and may be a fixed value or variable. The increases continue until the RL closed loop power control resumes.

Figure 10:
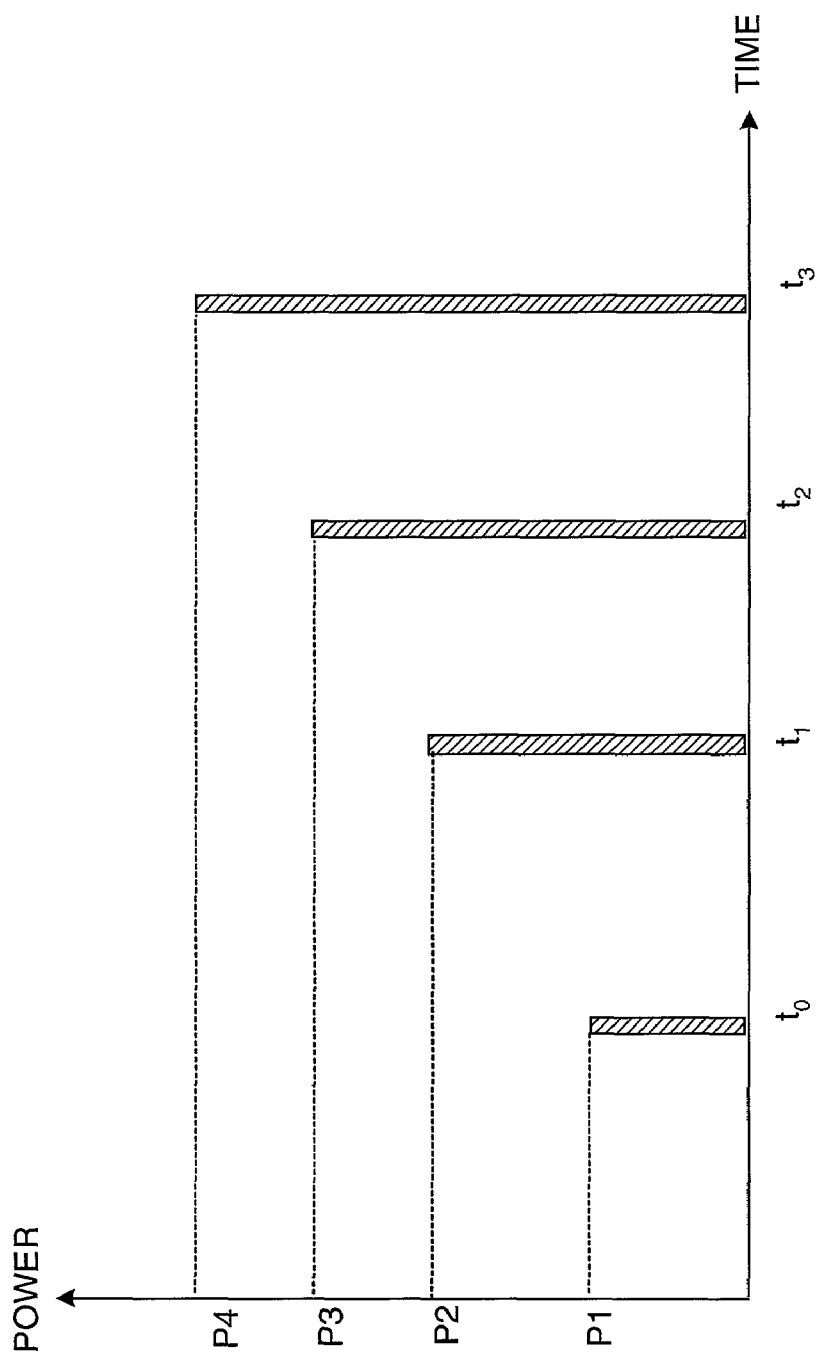
FIG. 10 illustrates in timing diagram form initialization of a transmit power level at a mobile station subsequent to call recovery according to one embodiment of the present invention.

Another embodiment starts recovery with open loop control based on total received power in the band. This procedure is similar to the access procedure defined in IS-95 and IS-2000. This may be corrected for multiple forward link base stations visible to MS 38. The open loop control continues until closed loop power control resumes. FIG. 10 illustrates the power adjustments according to this embodiment. The horizontal axis represents time and the vertical axis represents the transmission power level. At a first time t1 the transmit power is at an initial power level. After a first time period, at time t2, the transmit power is increased by a predetermined increment value. The increment value may be a fixed value or may be variable, either increasing or decreasing with increasing time. In one embodiment, the increment value is adaptive and responds to the conditions of the system 10, wherein the increment value may increase or decrease from one time period to a subsequent time period. Finally, a predetermined maximum transmit power level may be reached after a predetermined number of time periods. The transmit power then is at a ceiling awaiting the resumption of the closed loop power control.

In still another embodiment, the initial transmit power is based on the signal quality of pilots received. The signal quality is measured by a pilot $E_c/I_0$ or a pilot $E_c$ for the intended AS. In open loop power control, the transmit power typically has a relationship given as:

$$T_x = (-R_x) + k \tag{1}$$

wherein k is a constant, Tx is the RL transmit energy and Rx is the FL received energy. For a closed loop power control method, the transmit power typically has a relationship given as:

$$T_x = (-R_x) + k + y(t), \tag{2}$$

and y(t) is an cumulative correction variable based on all the valid power control command received up to time t. The term (k+y(t)) is referred to as β. In an alternate form, the following relationship holds:

$$T_x + R_x = k + y(t), \tag{3}$$

The determination of an initial transmit power applies the β of the previous transmissions to the new transmissions. The new transmit power level is then calculated as:

$$T_x(t) = (-R_x(t) + T_x(0) + R_x(0)), \tag{4}$$

wherein Tx(0) is the transmit energy prior to the call recovery, Rx(0) is the receive energy prior to the call recovery. In this way, the transmit power is adjusted according to the previous ratio of transmit power level to receive power level.

Figure 11:
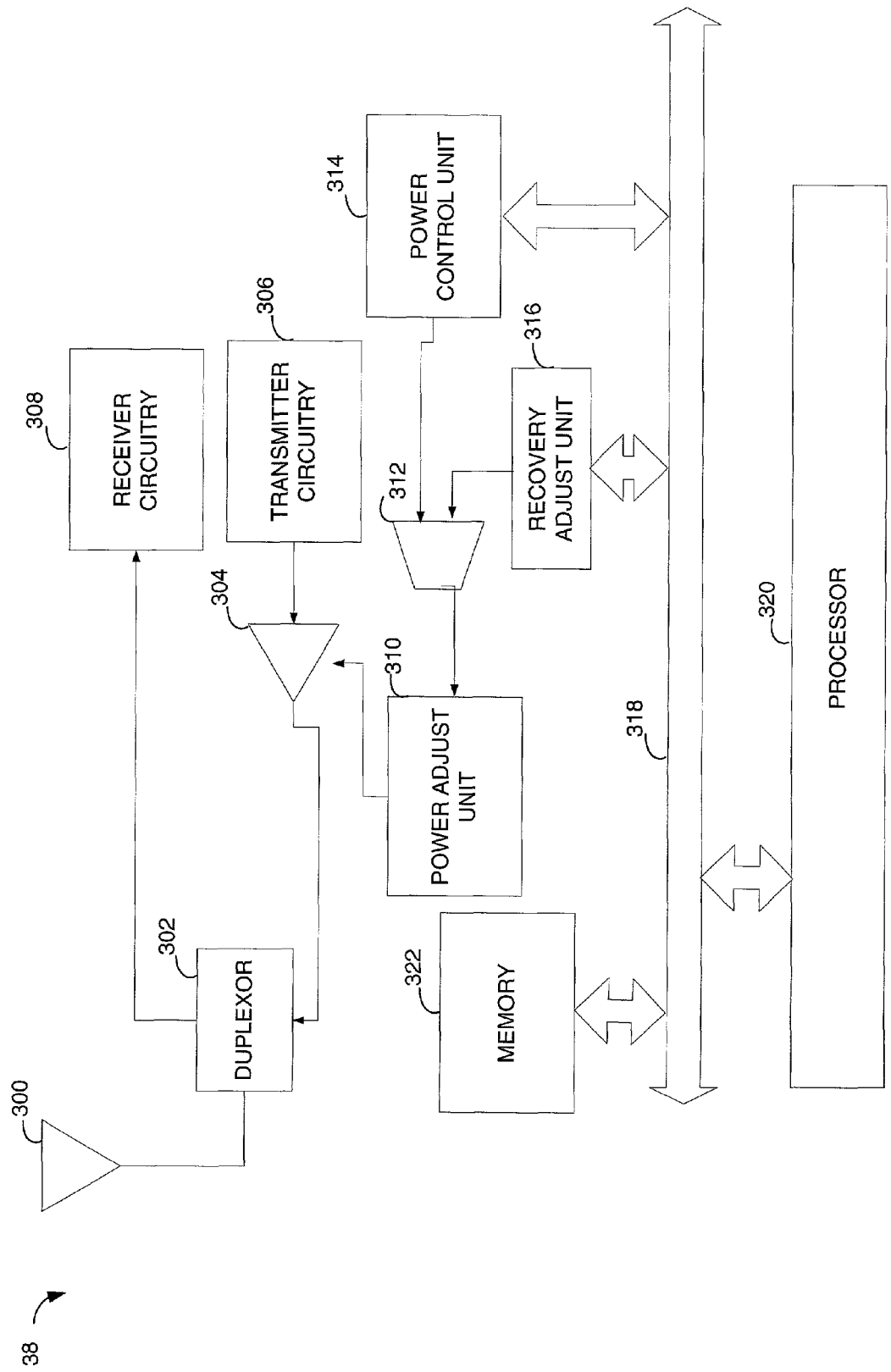
FIG. 11 illustrates in block diagram form a wireless apparatus MS 38 operating in system 10 of FIG. 1. according to one embodiment.

A wireless apparatus MS 38 operating in system 10 of FIG. 1, such as a cell phone or a personal digital assistant (PDA), is illustrated in FIG. 11. The MS 38 includes an antenna 300 for transmitting and receiving. The antenna 300 is coupled to a duplexor 302 for isolating the receiver path from the transmitter path. The duplexor is coupled to the receiver circuitry 308 forming the receiver path and is coupled to an amplifier 304 and transmit circuitry 306 forming the transmitter path. The amplifier 304 is further coupled to a power adjust unit 310 that provides the control of the amplifier 304. The amplifier 304 receives the transmission signals from the transmit circuitry 306.

Received signals via antenna 300 are provided to a power control unit 314 that implements a closed loop power control scheme. The power control unit 314 is coupled to a communication bus 318. The communication bus 318 provides a common connection between modules within the MS 38. The communication bus 318 is further coupled to a memory 322 and a recovery adjusts unit 316. The memory 322 stores computer readable instructions for a variety of operations and functions applicable to MS 38. The processor 320 performs the instructions stored in memory 322. For normal operating conditions, the power control unit generates a PC signal to power adjust 310 via multiplexor 312. The power adjusts 310 then transfers the PC signal as an amplification level to the amplifier 304.

When a call recovery occurs, the MS 38 may disable the transmitter. When the transmitter is re-enabled, a hand-off complete signal is provided to the recovery adjust unit 316. The hand-off complete signal instructs the recovery adjust unit 316 to generate a predetermined PC signal. The PC signal so generated may implement any of the schemes for initial RL transmit power generation discussed hereinabove, or may implement an alternate method. The hand-off complete signal is also provided to control the multiplexor 312. Subsequent to call recovery, the PC signal generated by the recovery adjust unit 316 is forwarded to the power adjust unit 310. In parallel, closed loop power control begins. Once closed loop power control has fully resumed, the hand-off complete signal is negated, and the multiplexor 312 selects the PC signal generated by power control unit 314 to provide to power adjust 310. The operation of recovery agent unit 316 may be performed by the microprocessor 320 operating on software instructions or may be implemented in hardware for efficient, reliable operation.

In one embodiment, specific operations of the MS 38 or BS1 32 are considered special events. The special events include a variety of conditions and procedures that may cause false triggers to occur. In other words, special events may produce a situation where a call recovery trigger occurs, but the call is not distressed. One special event is a mobile position locator search. The MS 38 is instructed to search on an alternate frequency for a Global Position Systeme (GPS) signal. The GPS provides a location of the MS 38 or partial information of the location of the MS 38. The mobile position locator search is done periodically or aperiodically. Typically, the MS 38 has a priori information regarding the timing of such searches. Other events may include candidate frequency search in preparation for an inter-frequency hard handoff where the mobile station tunes to another frequency to search for signal from base stations on a different frequency.

Other events may include actions taken by the MS 38 during which a trigger is to be ignored. In these type events, the MS 38 notifies the source cell BS1 32 of a special event. In one embodiment, a special event is a candidate frequency search, wherein MS 38 tunes to a different frequency to look for signals from neighbor base stations on that frequency. This allows a better transition between coverage on different frequencies, e.g. switching between a Personal Communication System (PCS) frequency and a cellular frequency. On occurrence of this type of mobile station initiated special event, the MS 38 notifies the source cell BS1 32 to ignore triggers with respect to MS 38 during a specific time period or until further notification.

According to one embodiment, in order to avoid such false triggers during special events, the source cell base station, such as BS1 32, grants the permission for the event and notifies the MS 38 the timing of the event, including at least when the event is to begin and the length of time allocated to the event. The MS 38 and the base stations in its AS disable the call recovery trigger(s) from initiating a call recovery during the special event.

In an alternate embodiment, MS 38 notifies the BS1 32 of an upcoming special event or a set of these special events. In response to the notification the BS1 32 may approve the special event, veto the event, or reschedule the event. Again, this provides the MS 38 and the base stations in its AS with sufficient information to disable the call recovery triggers during the special event.

Thus presented herein is a novel and improved method of maintaining communications within a wireless communication system. When the communication link between a mobile station and a corresponding source cell base station is in trouble, the mobile station and the infrastructure prearrange potential rescue base stations. The source cell base station contacts all recovery-capable neighbors as potential rescuers. A recovery-capable neighbor has a predefined default channel adapted for soft hand-off with a mobile station. The default channel is only used temporarily during the initial portion of hand-off. Each rescue base station is instructed to use a default channel for rescue transmissions. The rescue transmission is considered a call recovery operation. The mobile station establishes a soft hand-off with rescue base station, wherein the FL uses the default channel. The rescue base station then initiates transmissions on an alternate channel. Once hand-off is complete the rescue base station discontinues use of the default channel with respect to transmissions to the mobile station. In one embodiment, the source cell base station provides the mobile station with the list of recovery-capable neighbors as overhead during transmissions and prior to development of the communication link problem. In this way, for situations where the FL is lost prior to receipt of hand-off information, the mobile station has sufficient information to proceed with a hand-off.

In an alternate embodiment, more than one default channel is assigned to the neighbor BS2 34. The use of multiple default or rescue channels increases the call recovery capability of a system 10. Each neighbor is then able to contribute to call recovery of more than one mobile station, such as MS 38. In operation, prior to call recovery, the source cell BS1 32 provides to MS 38 an identifier corresponding to the multiple channels associated with BS2 34. The MS 38 and BS2 34 each store a deterministic function, such as a hash function, to map the identifiers to a specific channel. The use of a hash function in particular is a pseudorandom procedure. In addition, an electronic serial number is assigned to the MS 38. The electronic serial number may be stored in the MS 38 or may be provided to the MS 38 on call recovery. On call recovery, the source cell BS1 32 provides the electronic serial number of MS 38 to the BS2 34. The BS2 34 and the MS 38 both apply the predetermined function to calculate the appropriate default channel.

A hash function for a data structure allows recognition of a key word in a set of words using exactly one probe into the data structure. A hash function maps its argument to a result of predetermined type. A hash function is deterministic and stateless. That is, the return value depends only on the argument, and equal arguments yield equal results. It is important for hash function to minimize collisions, wherein a collision is defined as two different arguments that hash to the same value. It is also important that the distribution of hash values be uniform; that is, the probability that a hash function returns any particular value of predetermined type should be roughly the same as the probability that it returns any other value. In alternate embodiments, other forms of cryptographic functions may be implemented for identification of the multiple default channels on call recovery.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software modules could reside in RAM memory, flash memory, ROM memory, EPROM memory, EEPROM memory, registers, hard disk, a removable disk, a CD-ROM, or any other form of storage medium known in the art. The processor may reside in an ASIC (not shown). The ASIC may reside in a telephone (not shown). In the alternative, the processor may reside in a telephone. The processor may be implemented as a combination of a DSP and a microprocessor, or as two microprocessors in conjunction with a DSP core, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for call recovery by a wireless mobile station, comprising:
communicating with base stations in an active set of the mobile station;
determining if a call recovery trigger has occurred;
if the call recovery trigger has occurred, determining if a transmitter of the mobile station is enabled;
if the transmitter of the mobile station is enabled, disabling the transmitter based on a trigger condition;
starting a recovery timer after an expiration of a wait timer;
enabling the transmitter of the mobile station; and
after enabling the transmitter of the mobile station, transmitting a call recovery preamble for a predetermined time period after the expiration of the wait timer, the call recovery preamble being exclusive of and adjacent to a pilot strength measurement message and transmission of the call recovery preamble terminates before transmission of the pilot strength measurement message.

2. The method of claim 1, further comprising:
changing the active set of mobile station at the same time as transmitting the call recovery preamble.

3. The method of claim 2, further comprising:
transmitting the pilot strength measurement message;
determining if a handoff direction message has been received;
if the handoff direction message has not been received, determining if a number of transmissions of the pilot strength measurement message has exceeded a maximum limit; and
ending the call recovery if the number of transmissions of the pilot strength measurement message has exceeded the maximum limit.

4. The method of claim 1, wherein, after enabling the transmitter, the call recovery preamble is initially transmitted at a last power level used prior to disabling the transmitter.

5. The method of claim 1, wherein, after enabling the transmitter, the call recovery preamble is initially transmitted at a predetermined initial power level.

6. The method of claim 1, wherein, after enabling the transmitter, the call recovery preamble is initially transmitted at a power level based on a signal quality of one or more forward link signals.

7. The method of claim 1, wherein the transmission of the pilot strength measurement message occurs before a handoff direction message is received during the call recovery.

8. A non-transitory computer readable medium comprising instructions, the instructions when executed by the computer comprising a wireless mobile station, cause the wireless mobile station to perform operations comprising:
communicating with base stations in an active set of the mobile station;
determining if a call recovery trigger has occurred;
if the call recovery trigger has occurred, determining if a transmitter of the mobile station is enabled;
if the transmitter of the mobile station is enabled, disabling the transmitter based on a trigger condition;
starting a recovery timer after an expiration of a wait timer;
enabling the transmitter of the mobile station; and
after enabling the transmitter of the mobile station, transmitting a call recovery preamble for a predetermined time period after the expiration of the wait timer, the call recovery preamble being exclusive of and adjacent to a pilot strength measurement message and transmission of the call recovery preamble terminates before transmission of a pilot strength measurement message.

9. The non-transitory computer readable medium of claim 8, wherein the operations further comprise:
changing the active set of mobile station at the same time as transmitting the call recovery preamble.

10. The non-transitory computer readable medium of claim 9, wherein the operations further comprise:
transmitting a pilot strength measurement message;
determining if a handoff direction message has been received;
if the handoff direction message has not been received, determining if a number of transmissions of the pilot strength measurement message has exceeded a maximum limit; and
ending the call recovery if the number of transmissions of the pilot strength measurement message has exceeded the maximum limit.

11. The non-transitory computer readable medium of claim 8, wherein, after enabling the transmitter, the call recovery preamble is initially transmitted at a last power level used prior to disabling the transmitter.

12. The non-transitory computer readable medium of claim 8, wherein, after enabling the transmitter, the call recovery preamble is initially transmitted at a predetermined initial power level.

13. The non-transitory computer readable medium of claim 8, wherein, after enabling the transmitter, the call recovery preamble is initially transmitted at a power level based on a signal quality of one or more forward link signals.

14. A wireless mobile station having call recovery, comprising:
means for communicating with base stations in an active set of the mobile station;
means for determining if a call recovery trigger has occurred;
means for determining if a transmitter of the mobile station is enabled;
means for disabling the transmitter based on a trigger condition;
means for starting a recovery timer after an expiration of a wait timer;
means for enabling the transmitter of the mobile station; and
means for transmitting a call recovery preamble for a predetermined time period after the expiration of the wait timer, the call recovery preamble being exclusive of and adjacent to a pilot strength measurement message and transmission of the call recovery preamble terminates before transmission of the pilot strength measurement message.

15. The wireless mobile station of claim 14, further comprising means for changing the active set of mobile station at the same time as transmitting the call recovery preamble.

16. The wireless mobile station of claim 15, further comprising:
means for transmitting a pilot strength measurement message;
means for determining if a handoff direction message has been received;
means for determining if a number of transmissions of the pilot strength measurement message has exceeded a maximum limit; and
means for ending the call recovery if the number of transmissions of the pilot strength measurement message has exceeded the maximum limit.

17. The wireless mobile station of claim 14, wherein the means for transmitting initially transmits the call recovery preamble at a last power level used prior to the transmitter being disabled.

18. The wireless mobile station of claim 14, wherein the means for transmitting initially transmits the call recovery preamble at a predetermined initial power level.

19. The wireless mobile station of claim 14, wherein the means for transmitting initially transmits the call recovery preamble at a power level based on a signal quality of one or more forward link signals.

20. The wireless mobile station of claim 14 wherein the transmission of the pilot strength measurement message occurs before a handoff direction message is received during the call recovery.

21. A wireless mobile station, comprising:
a processor; and
circuitry coupled to the processor configured to communicate with base stations in an active set of the mobile station, determine if a call recovery trigger has occurred, determine if a transmitter of the mobile station is enabled if the call recovery trigger has occurred, disable the transmitter based on a trigger condition if the transmitter of the mobile station is enabled, start a recovery timer after an expiration of a wait timer, enable the transmitter of the mobile station, and transmit a call recovery preamble for a predetermined time period after the expiration of the wait timer, the call recovery preamble being exclusive of and adjacent to a pilot strength measurement message and transmission of the call recovery preamble terminates before transmission of the pilot strength measurement message after enabling the transmitter of the mobile station.

22. The wireless mobile station of claim 21, wherein the circuitry coupled to the processor is further configured to change the active set of mobile station at the same time as transmitting the call recovery preamble.

23. The wireless mobile station of claim 22, wherein the circuitry coupled to the processor is further configured to transmit a pilot strength measurement message, determine if a handoff direction message has been received, determine if a number of transmissions of the pilot strength measurement message has exceeded a maximum limit if the handoff direction message has not been received, and end the call recovery if the number of transmissions of the pilot strength measurement message has exceeded the maximum limit.

24. The wireless mobile station of claim 21, wherein the circuitry coupled to the processor is configured to initially transmit the call recovery preamble after the transmitter is enabled at a last power level used prior to disabling the transmitter.

25. The wireless mobile station of claim 21, wherein the circuitry coupled to the processor is configured to initially transmit the call recovery preamble after the transmitter is enabled at a predetermined initial power level.

26. The wireless mobile station of claim 21, wherein the circuitry coupled to the processor is configured to initially transmit the call recovery preamble after the transmitter is enabled at a power level based on a signal quality of one or more forward link signals.

* * * * *